(12) United States Patent
Hyme

(10) Patent No.: US 7,146,844 B2
(45) Date of Patent: Dec. 12, 2006

(54) APPARATUS AND METHOD FOR TESTING HYDRAULIC PRESSURE RELIEF VALVES

(75) Inventor: Kenneth R. Hyme, Lancaster, OH (US)

(73) Assignee: Columbus Equipment Company, Columbus, OH (US)

( * ) Notice: Subject to any disclaimer, the term of this patent is extended or adjusted under 35 U.S.C. 154(b) by 174 days.

(21) Appl. No.: 10/736,482

(22) Filed: Dec. 15, 2003

(65) Prior Publication Data

US 2004/0129054 A1 Jul. 8, 2004

Related U.S. Application Data

(60) Provisional application No. 60/433,707, filed on Dec. 16, 2002.

(51) Int. Cl.
*G01L 27/00* (2006.01)
(52) U.S. Cl. ...................................... 73/1.72
(58) Field of Classification Search ............... 73/1.71, 73/1.72, 168
See application file for complete search history.

(56) References Cited

U.S. PATENT DOCUMENTS 2,178,901 A * 11/1939 Webster ..................... 73/1.72
3,042,075 A * 7/1962 Pettibone ................... 137/539
4,548,067 A 10/1985 Cox
4,916,938 A 4/1990 Aikin et al. .................... 73/46
5,069,062 A 12/1991 Malecek et al. ............. 73/49.7
5,597,008 A * 1/1997 Overdiek et al. ........ 137/15.18
5,856,615 A * 1/1999 Easter ........................ 73/1.72

FOREIGN PATENT DOCUMENTS

DE 1055911 4/1959

* cited by examiner

*Primary Examiner*—Robert Raevis
(74) *Attorney, Agent, or Firm*—Wood, Herron & Evans, LLP

(57) ABSTRACT

An apparatus for testing hydraulic pressure relief valves has a fixture body with an internal cavity sized to receive the valve completely within the fixture body. A closure may be secured to the body to seal the valve within the cavity. The apparatus further includes inlet and outlet ports for providing a flow of high-pressure hydraulic fluid though the cavity, and a pressure port for coupling pressure monitoring instrumentation to the cavity. When a valve is installed within the apparatus and the inlet is coupled to a source of high-pressure hydraulic fluid, the actuation pressure of the valve may be determined by monitoring the instrumentation.

7 Claims, 2 Drawing Sheets

APPARATUS AND METHOD FOR TESTING HYDRAULIC PRESSURE RELIEF VALVES

This application claims priority to U.S. Provisional Application Ser. No. 60/433,707 filed on Dec. 16, 2002, incorporated herein by reference in its entirety.

FIELD OF THE INVENTION

The present invention pertains to hydraulic devices, and more particularly to an apparatus for measuring the actuation pressure of a hydraulic relief valve.

BACKGROUND OF THE INVENTION

Pressure relief valves are used in various hydraulic applications to prevent the accumulation of excessive hydraulic pressure that might otherwise damage a hydraulic machine or its components. Upon actuation, hydraulic pressure relief valves open to permit hydraulic fluid to pass through the valve. The hydraulic fluid is often routed to a sump, or other reservoir, for recirculation through the hydraulic system. The valves are typically adjustable to permit the selection of a specific pressure at which the valve will actuate to relieve pressure.

One particular application where pressure relief valves are used is hydrostatic drive units that propel various machines such as tractors, bulldozers, skid steers and other heavy equipment. The hydrostatic drive units may also provide motive forces for various implements used on these machines. In such applications, it is important that the pressure relief valves be correctly tuned to relieve hydraulic pressure at a predetermined pressure to ensure reliable operation of the machine. If the relief pressure is set too high, the machine can be damaged; if the pressure is set too low, oil is dumped too soon and the machine can stall under load. In typical applications, multiple valves may be used with a single pump to provide the motive force for various functions of the machine. For example, a drive system configured to provide left, right, forward and reverse movement of a machine may typically utilize four valves per pump, one valve for each of the aforementioned motions. If each of the four valves is not correctly tuned, the drive system will not function properly.

Generally, it is impractical to tune the pressure relief valves while they are installed on the machine. For example, a hydrostatic drive system may be located in an area of the machine that is not readily accessible, such as beneath an operator cab. Furthermore, when the valves are installed on the machine, it is difficult to obtain an accurate determination of the pressure at which the valve actuates, or "cracks", to relieve the pressure because the drive system includes a cut-off mechanism that senses pressure in the pump and limits stroke of the pump piston to control the pressure. Furthermore, the pumps are typically capable of supplying a flow of hydraulic fluid that is much greater than the through-flow capacity of the valves. When the valves are actuated on the machine, it is often difficult to observe the associated drop in pressure if the pump piston has not destroked. It is inadvisable to set the pressure relief valves blindly by adjusting them to a fully closed position and then backing the adjustment off an arbitrary amount because such adjustment may set the actuation pressure too high, creating excessive pressures which may damage the equipment.

Accordingly, there is a need for apparatus and methods for tuning pressure relief valves prior to installation in a machine and which overcomes drawbacks of the prior art, such as those discussed above.

SUMMARY OF THE INVENTION

The present invention provides a test apparatus for testing hydraulic pressure relief valves. The apparatus includes a fixture body having an internal cavity sized to receive a pressure relief valve through an aperture in the body so that the valve is completely received within the cavity. A valve seat is formed within the cavity, near a fluid outlet and engages the valve when it is installed within the apparatus. The apparatus further includes a closure which may be secured over the aperture to seal the valve within the cavity.

The test apparatus includes a fluid inlet, a fluid outlet, and a pressure port in communication with the cavity. The inlet may be coupled to a source of high-pressure hydraulic fluid so that the fluid may flow through a valve installed within the cavity and out through the outlet to a reservoir. Pressure within the cavity may be monitored by instrumentation coupled to the pressure port to determine when the valve has been actuated.

Advantageously, the test apparatus may be used to determine the actuation pressure of a pressure relief valve, prior to installation within a hydrostatic drive unit. If the valve is configured to be adjustable, the apparatus may also be used to tune the valve to a desired actuation pressure. To test a valve, it is installed within the cavity of the test apparatus and the cavity is sealed with the closure. The inlet is coupled to the source of high-pressure hydraulic fluid flow. Prior to actuation of the valve, hydraulic fluid flows through a restricted aperture formed in a spool within the valve and exits the cavity through the outlet of the apparatus. When the pressure within the cavity reaches the actuation pressure of the valve, the valve opens, or "cracks" to permit the fluid to flow around the spool and thereby relieve the pressure. Actuation of the valve is thus accompanied by a drop in pressure that is observable via the pressure gage, or other instrumentation, coupled to the cavity through the pressure port.

In another aspect of the invention, a pressure relief valve may be tuned to actuate at a desired pressure using the test apparatus. A method of tuning a hydraulic relief valve includes testing the valve, as described above, to determine the present actuation pressure. The valve may then be removed from the cavity and adjusted to either increase or decrease the actuation pressure, as required. After adjustment, the valve may be installed within the cavity and retested to determine the effect of the adjustment. These steps may be repeated until the valve is set to actuate at the desired actuation pressure.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figures 1, 2:
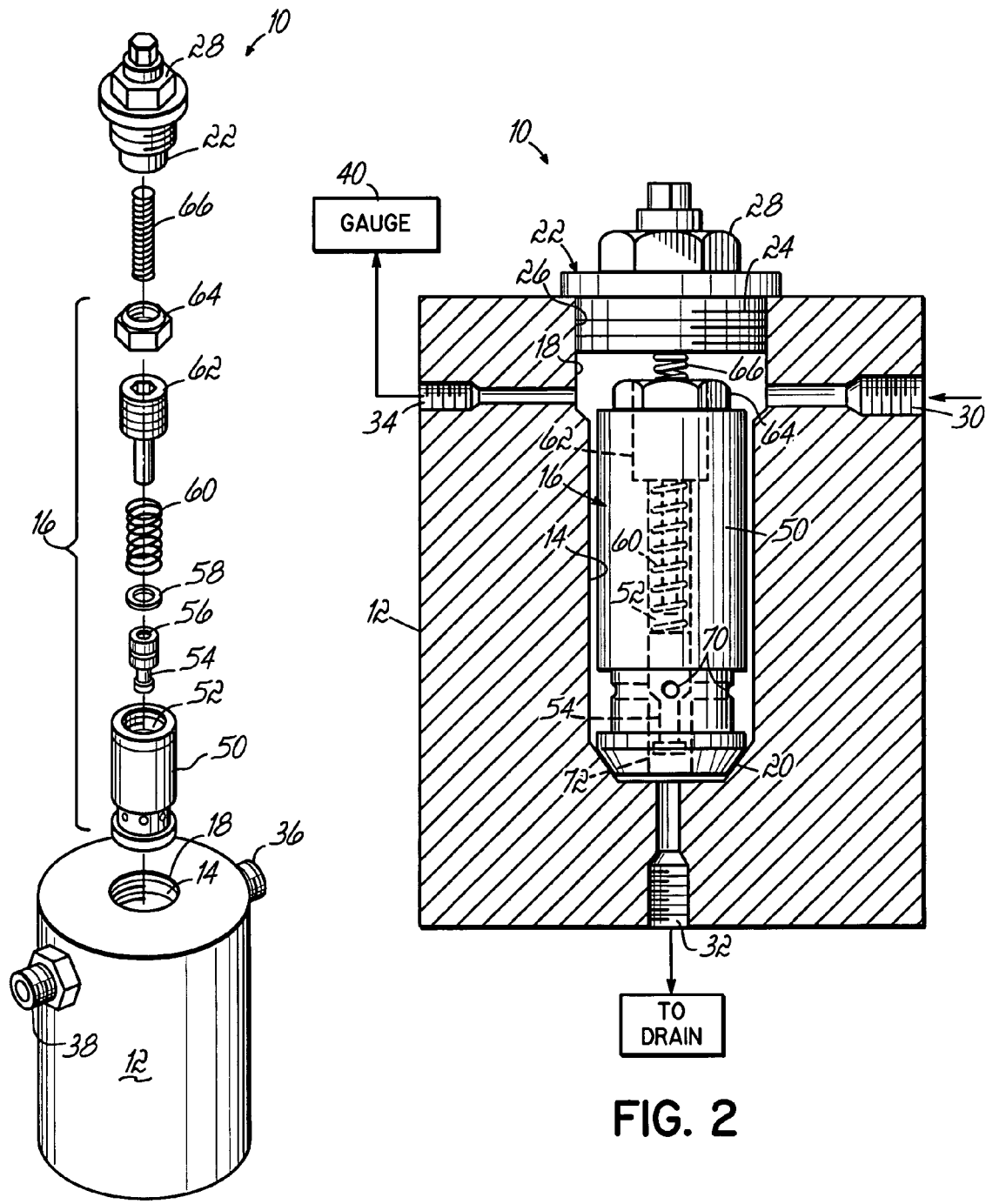
FIG. 1 is an exploded perspective view of an exemplary test apparatus of the present invention.
FIG. 2 is a partial cross-sectional view of the apparatus of FIG. 1, depicting a valve installed within the apparatus.

Referring to FIGS. 1 and 2, there is shown an exemplary test apparatus 10 of the present invention. Test apparatus 10 includes a fixture body 12 having an internal cavity 14 sized to receive a pressure relief valve 16. As depicted in FIG. 1, fixture body 12 has a generally cylindrical configuration, but it will be recognized that the fixture body 12 may be constructed to have other configurations as well. An aperture 18 formed into fixture body 12 provides access to cavity 14 through which valve 16 may be received into the cavity 14. As shown in FIG. 2, a valve seat 20 is formed into the body 12 at the lower end of cavity 14, generally opposite aperture 18, and is configured to sealingly engage the pressure relief valve 16.

Test apparatus 10 further includes a closure 22 configured to be secured to fixture body 12 to sealingly engage aperture 18 whereby the pressure relief valve 16 may be completely encapsulated within the fixture body 12 and enclosed by closure 22. In the exemplary embodiment shown in FIGS. 1 and 2, closure 22 includes a threaded portion 24 configured to engage corresponding threads 26 formed in fixture body 12 proximate aperture 18. Closure 22 may further include a tool engagement portion 28 configured to engage a tool (not shown) for securing closure 22 to fixture body 12. In the exemplary embodiment shown, tool engagement portion 28 is configured generally in the shape of a conventional hex-head-nut.

Figure 2A:
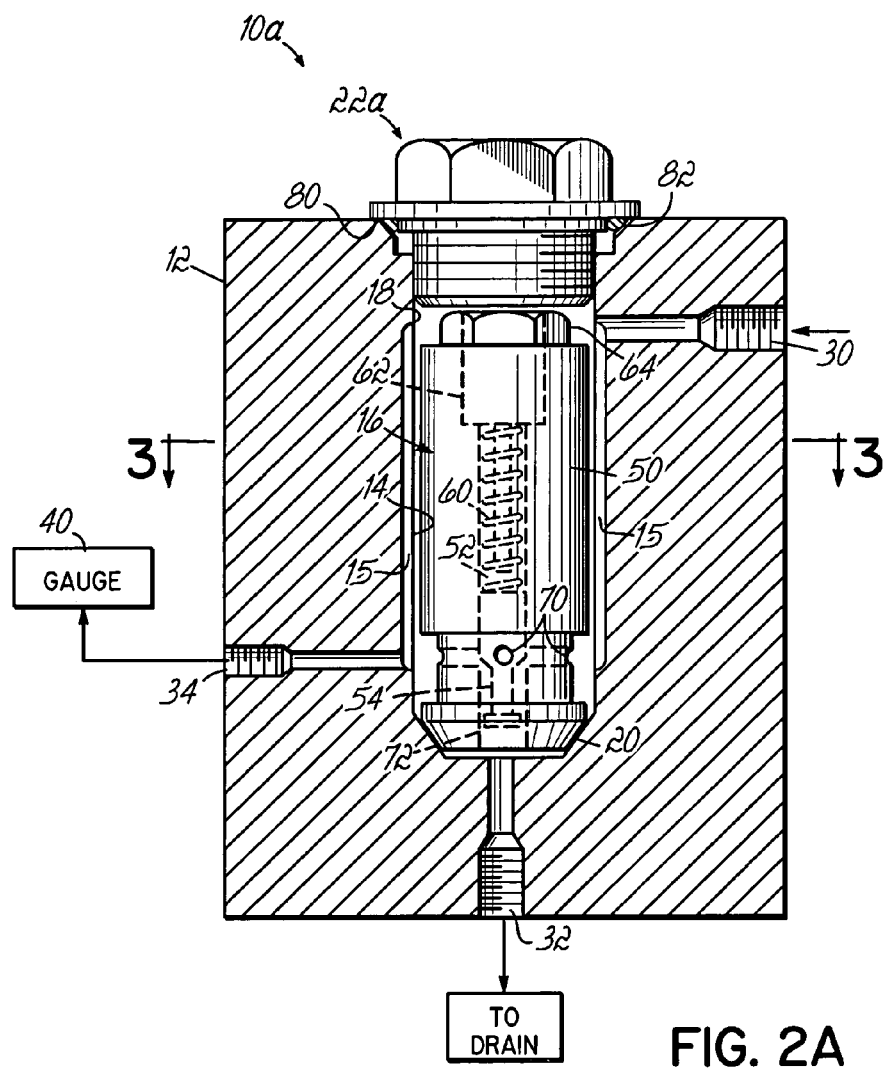
FIG. 2A is a partial cross-sectional view, depicting another embodiment of a test apparatus of the present invention.
Figure 3:
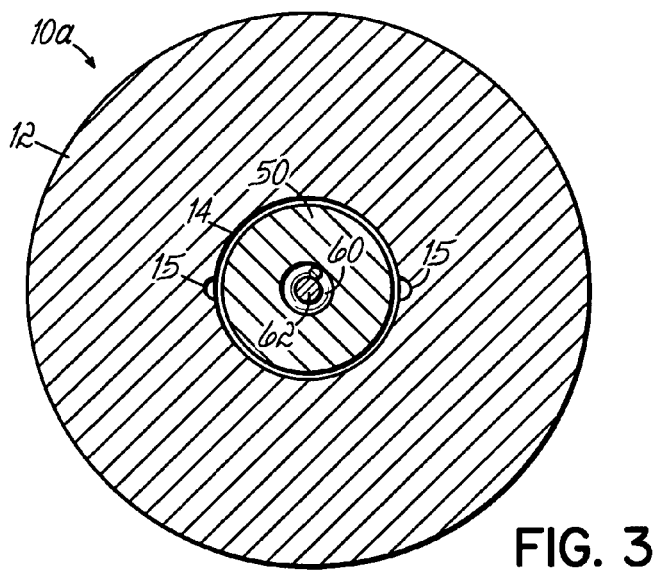
FIG. 3 is a cross-sectional view of the apparatus of FIG. 2A, taken along line 3—3.

In another embodiment, depicted in FIG. 2A, test fixture 10a includes a closure 22a formed from a standard 1-inch, grade 8 NFT bolt. A shoulder 80 formed in the underside of the bolt head is configured to accommodate an O-ring 82 such that cavity 14 is sealed by closure 22a when closure 22a is secured to fixture body 12. The bolt length is sized to provide a slight clearance between the closure 22a and the valve 16, whereby pressurizing cavity 14 causes valve 16 to seat against valve seat 20 without the need for a preload spring 66 (discussed below). In an exemplary embodiment, the clearance between the closure 22a and valve 16 is approximately 1/16-inch. However, due to the fact that the valve 16 is seated by the pressure in cavity 14, even shorter valves may be tested without requiring the closure 22a to be lengthened.

Test apparatus 10 further includes a fluid inlet 30 and a fluid outlet 32 formed into fixture body 12 and communicating with internal cavity 14. A pressure port 34 is also formed into fixture body 12 and communicates with internal cavity 14. In FIGS. 1 and 2, pressure port 34 is depicted at a location proximate an upper end of fixture body 12. Alternatively, pressure port 34 may be located closer to outlet 32, adjacent valve seat 20, as depicted in FIG. 2a, or at any other location suitable for providing access to cavity 14 to measure pressure within cavity 14. Inlet 30, outlet 32 and pressure port 34 may include threaded portions, as depicted in FIG. 2, configured to receive fittings 36, 38, as depicted in FIG. 1. Fittings 36, 38 may be threaded pipe fittings, quick-disconnect hydraulic fittings, or any other fitting suitable for coupling test apparatus 10 with hydraulic lines or instrumentation, such as pressure gauges.

Internal cavity 14 is sized to receive a pressure relief valve 16, such that is may be completely enclosed within the test apparatus 10 when closure 22 is secured to fixture body 12. An exemplary pressure relief valve 16 is illustrated in an exploded view in FIG. 1 and includes a sleeve 50 having a passage 52 formed therethrough. Pressure relief valve 16 further includes a valve spool 54 having a fluid passage 56, a seal 58, a valve spring 60, a threaded plug 62, and a nut 64. Plug 62 includes a threaded portion which engages corresponding threads formed into the interior 52 of sleeve 50, and also engages threads formed into nut 64 whereby the components of the pressure relief valve may be assembled within sleeve 50 and secured with nut 64. Valve 16 may be adjusted to actuate at various pressures by varying the depth at which plug 62 is threaded within sleeve 50 to compress valve spring 60.

To test pressure relief valve 16, the valve is inserted within the interior cavity 14 of fixture body 12 to engage valve seat 20. A preload spring 66 is positioned on nut 64 and closure 22 is secured to fixture body 12 proximate aperture 18. The preload spring 66 biases pressure relief valve 16 against valve seat 20 during test. In use, inlet 30 is coupled to a source of high-pressure hydraulic fluid and port 34 is coupled to a pressure gauge. The high-pressure hydraulic fluid enters through inlet 30 and flows around pressure relief valve 16 through the clearance space between sleeve 50 and the internal cavity 14. In the embodiment, depicted in FIG. 2A, a pair of grooves 15 are formed in fixture body 12, lengthwise along cavity 14 and spaced approximately 180 degrees apart, to facilitate the flow of hydraulic fluid around sleeve 50.

The high-pressure hydraulic fluid enters sleeve 50 through openings 70 and flows through fluid passage 56 in the valve spool 54 and out of the valve sleeve 50 through a flow outlet 72 in communication with outlet 32 of fixture body 12. The fluid passage 56 in valve spool 54 has a flow capacity that is much lower than the volume of flow entering fixture body 12 through inlet 30 whereby the flow becomes choked and pressure within internal cavity 14 begins to increase. The increasing pressure of internal cavity 14 may be monitored by pressure gauge 40 coupled to pressure port 34. When the pressure inside internal cavity 14 reaches the actuation, or "cracking" pressure of pressure relief valve 16, valve spool 54 is moved against the bias of valve spring 60 away from an internal valve seat (not shown) within sleeve 50 to admit hydraulic fluid around valve spool 54 and through flow outlet 72 to the outlet 32 formed in fixture body 12. When pressure relief valve 16 actuates, a decrease in pressure may be observed on pressure gauge 40.

A test apparatus 10a, constructed as described above was tested according to SAE standard J1644, "Metallic Tube Connections for Fluid Power and General Use", to a pressure of 30,000 psi without failure. The SAE standard requires testing to four times the working pressure. Accordingly, the test apparatus 10a was qualified as being safe to at least 7,000 psi under the standard.

According to another aspect of the invention, a method of testing a hydraulic pressure relief valve 16 includes seating the valve 16 against a valve seat 20 within a cavity 14 of a fixture body 12, securing a closure 22 to the fixture body 12 to seal the valve within the cavity 14, biasing the valve 16 against the valve seat 20, coupling the cavity 14 to a source of high-pressure fluid flow, and monitoring the pressure within the cavity 14. A method of tuning a hydraulic pressure relief valve 16, according to the present invention, includes testing the hydraulic pressure relief valve 16, as described above, comparing the pressure at which the valve

16 actuates to a desired actuation pressure, and adjusting the valve 16 to change the pressure at which the valve 16 actuates.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. An apparatus for testing hydraulic pressure relief valves, comprising:
    a body constructed to withstand high pressure;
    a cavity formed into said body and configured to completely enclose a pressure relief valve therein, said cavity including a valve seat and an aperture through which the pressure relief valve may be received into said cavity to contact said valve seat;
    a pressure relief valve received in said cavity, said pressure relief valve comprising a sleeve having a passage therein, a valve spool within said passage, and a spring within said passage and cooperating with said valve spool to limit flow through said passage;
    a pressure gauge in communication with said cavity;
    at least one fluid inlet communicating with said cavity;
    a fluid outlet in communication with said cavity; and
    a closure sealingly couplable to said body, proximate said aperture, to sealably secure said pressure relief valve within said cavity.

2. The apparatus of claim 1, further comprising a biasing member associated with said closure and configured to bias the pressure relief valve against said valve seat.

3. The apparatus claim 1, wherein said body is constructed to withstand up to approximately 30,000 psi.

4. A method of testing a hydraulic pressure relief valve, the pressure relief valve including a sleeve having a passage, a valve spool within the passage, and a spring within the passage and cooperating with the valve spool to limit flow through the passage, the method comprising:
    seating the valve against a valve seat within a cavity of a test apparatus;
    sealingly securing a closure to the test apparatus to seal the valve within the cavity;
    coupling the cavity to a source of high-pressure fluid flow; and
    monitoring the pressure within the cavity.

5. The method of claim 4, further comprising biasing the valve against the valve seat.

6. A method of tuning a hydraulic pressure relief valve, the pressure relief valve including a sleeve having a passage, a valve spool within the passage, and a spring within the passage and cooperating with the valve spool to limit flow through the passage, the method, comprising:
    seating the valve against a valve seat within a cavity of a test apparatus;
    sealingly securing a closure to the test apparatus to seal the valve within the cavity;
    coupling the cavity to a source of high-pressure fluid flow;
    monitoring the pressure within the cavity;
    comparing the pressure at which the valve actuates to a desired actuation pressure; and
    adjusting the valve to change the pressure at which the valve actuates.

7. The method of claim 6, further comprising biasing the valve against the valve seat.

* * * * *